United States Patent [19]

Brown

[11] 3,711,772
[45] Jan. 16, 1973

[54] DIGITAL FUNDAMENTAL PRP ANALYZER FOR PULSE TRAIN SIGNALS

[76] Inventor: Bruce J. Brown, 4801 Kenmore Avenue, Apt. 1022, Alexandria, Va. 22304

[22] Filed: Dec. 14, 1971

[21] Appl. No.: 207,756

[52] U.S. Cl............324/78 D, 235/150.3, 324/77 R, 328/165
[51] Int. Cl.......G01n 23/02, G06f 15/20, H03b 1/04
[58] Field of Search........324/78 D, 78 F, 77 B, 77 C, 324/77 D; 235/150.3, 152; 343/5 DP

[56] References Cited

UNITED STATES PATENTS 3,167,738  1/1965  Westerfield.........................343/5 DP
3,560,852  2/1971  Haskin et al.........................324/77 B
3,646,330  2/1972  Rudnick et al......................324/78 D Primary Examiner—Alfred E. Smith
Attorney—R. S. Sciascia et al.

[57] ABSTRACT

A pulse-repetition-period analyzer comprising binary converter means for converting an input waveform into a series of equal-amplitude binary pulses, variable-length shift register means for sorting the pulses into a series of successive pulse trains ordered according to their pulse repetition periods, shift register means for rejecting from each pulse train any pulses constituting a harmonic rather than a fundamental signal at the input, weighted integrator means for individually integrating said fundamental pulse trains and time-delay control means for controlling the delay (or length) of the variable-length shift register and synchronizing the operation of the other components of the circuit.

10 Claims, 3 Drawing Figures

DIGITAL FUNDAMENTAL PRP ANALYZER FOR PULSE TRAIN SIGNALS

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

This invention relates to a pulse-repetition-period (PRP) analyzer.

There is a need in the radar detection field for identifying the source of incoming pulses. The identification is dependent on proper determination of the PRP of the incoming pulses and becomes quite difficult when more than one source of incoming pulses is present. The information which might be desired for a given communication channel is: (a) whether or not a periodic signal is present; (b) the number of periodic signals in the channel; (c) the relative amount of time that these signals are present; and (d) the PRP of each of these signals.

Three basic systems have previously been used to perform such operations: (a) and (b) Swept frequency and bandpass analyzers — The major drawback of these devices is that they display all signal harmonics in addition to the fundamental frequency. In cases of a channel with multiple signals, this results in serious problems, especially if the signals are harmonically related. The harmonics produced by one signal could mask the presence of a fundamental of another signal and prevent its detection. (c) Time Correlator — This device produces the correlation function of the input signal. But it also displays all sub-harmonics of the input signal and therefore has problems similar to those of the swept frequency and bandpass analyzers.

BRIEF SUMMARY OF THE INVENTION

The present invention comprises means which utilizes the techniques of time correlation, pulse suppression and weighted integration to provide a PRP analyzer which displays only the fundamental of each signal present in the communication channel. The input signal is sorted into a series of pulse trains according to their repetition periods, harmonics of each fundamental pulse frequency are then rejected and the outputs are sampled in time sequence after being weighted and integrated.

OBJECTS OF THE INVENTION

An object of this invention is to provide for analysis of input pulse trains so that they may be separated according to the individual repetitive pulse trains existing therein.

Another object is to provide a PRP analyzer capable of providing an output pulse indicating each fundamental PRP existing in a pulse train signal.

Other objects, advantages and novel features of the invention will become apparent from the following detailed description of the invention when considered in conjunction with the accompanying drawings wherein:

THE DRAWINGS

DETAILED DESCRIPTION

Figure 1:
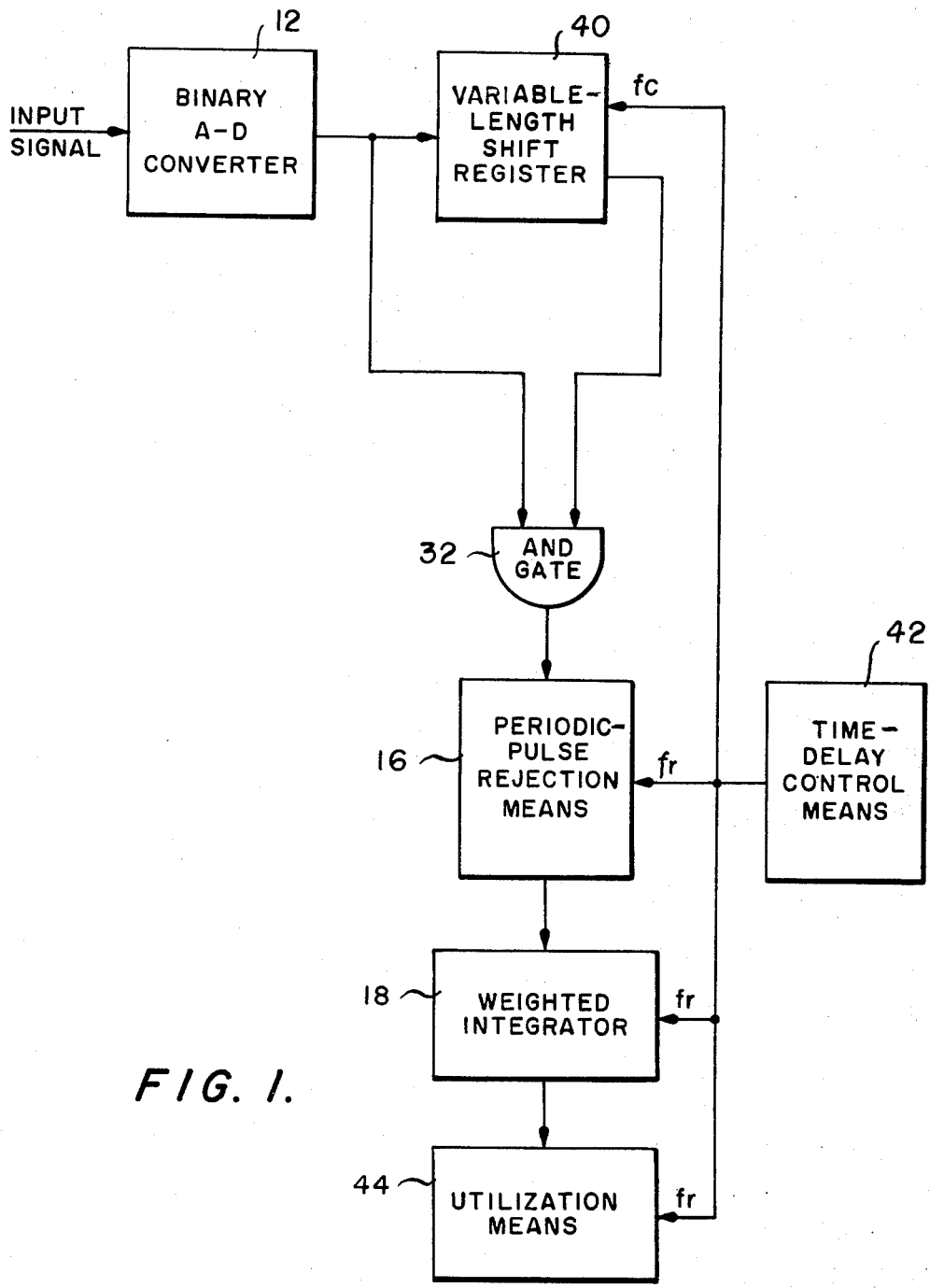
FIG. 1 is a block diagram of an embodiment of the invention.

The present invention is another form of the invention described in U.S. Pat. application, Ser. No. 207,757, N.C. 52159, filed Dec. 14, 1971. FIG. 1 of that application is the same as FIG. 3 of the present application.

Figure 3:
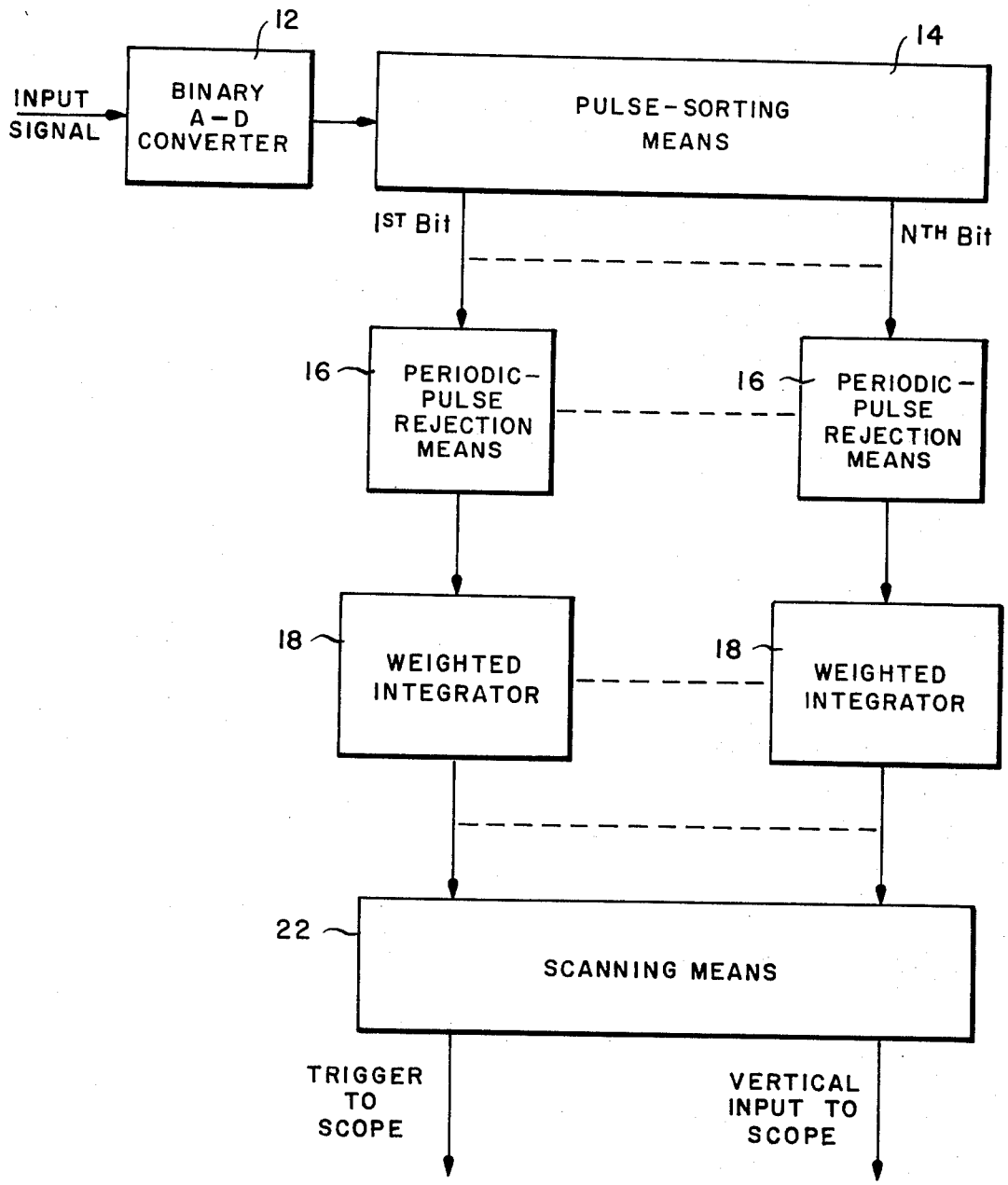
FIG. 3 is a block diagram of another form of the invention, included herein for explanatory purposes.

The results accomplished by the circuit of FIG. 3 can also be accomplished by the circuit of FIG. 1 which shows another form of the invention. The multiplicity of AND gates 32 (in pulse-sorting means 14), periodic pulse-rejection means 16 and weighted integrators 18 can be reduced to one AND gate, one periodic pulse-rejection means and one weighted integrator, and the scanning means 22 can be eliminated entirely since the scanning function is inherent in the form of the invention shown in FIG. 1.

Referring to FIG. 3, the input signal, which may contain a pulse train comprising a number of periodic pulse trains of different fundamental frequencies, or pulse repetition rates, is fed to a binary A–D converter 12 for providing binary signals, all of the same amplitude, from a pulsed input signal. The output from the converter 12 consists of pulses at the repetition rates, or PRP's (pulse repetition periods), of the input signal pulses.

The converter output pulses are fed to the pulse-sorting means 14 which sorts the pulses according to the PRP's present in the input signal pulse train. However, it should be noted that if the input-signal pulse train has a PRP of 0.1 second, for example, then PRP's of 0.1, 0.2, 0.3, 0.4 seconds, etc., are present. Therefore, the output of the pulse sorter is ambiguous for this situation. Means for rejecting all periodic pulse indications of more than a 0.1 second period is therefore required. This is provided by the periodic-pulse rejection (or harmonic rejection) means 16. There are a plurality of these rejection means in parallel channels, all fed from the pulse-sorting means 14. Each channel rejects all periodic pulses having a different period than that which it is designed to accept. The output of each rejection means is a pulse train which is fed to a weighted integrator 18 which integrates the pulses. The weights are designed to provide equal output amplitudes irrespective of the time period between the input pulses to each integrator.

The outputs of the weighted integrators are fed to a scanning means 22 which scans, or samples, the outputs of the weighted integrators in order and transfers the outputs to a display means, preferably an oscilloscope. The scanning is synchronized with the oscilloscope sweep which is started by the first scanning pulse. All integrator outputs are thus shown on the same sweep baseline, which is calibrated in time so that the fundamental period associated with the particular pulse or pulses shown on the scope can be determined.

FIGS. 2 through 5 of the previously mentioned patent application show particular implementations for the blocks shown in FIG. 3 of the present application and the specification thereof should be read for further information.

The present embodiment of the invention, as illustrated by the block diagram of FIG. 1, employs as a pulse-sorting means a variable-length shift register 40, (hereinafter also called the V register) an AND gate 32 (hereinafter also called the V-AND gate) in combination with a clocking pulse of frequency $f_c$ from the time-delay control means 42. Instead of a parallel-channel output of N bits, the V register has a single output but scans the input by introducing variable amounts of delay in successive order, so that it is equivalent to the N-bit shift register used in the FIG. 3 pulse-sorting means. As an example, the V register might delay the input by 1 μsecond for a period of 1 second; then the clock pulse ($f_c$) would shift the register so that it would provide 2 μseconds of delay for 1 second; and this would continue to occur up to a delay equivalent to the signal delay introduced by the N-bit, parallel-output, shift register used in FIG. 3. The total delay required is determined, of course, by the range of PRP's expected in the input signal. The period of the clocking pulses controls the dwell time (i.e., time between each shift) of the variable-length shift register 40; the total time delay $T_D$ through the register is $T_D = N \times T_c$, where $N$ is the total number of bits in the register and $T_c$ is the period of the clocking pulses. Thus, the time delay through the register is inversely proportional to the clocking frequency $f_c$ ($T_c = 1/f_c$).

The clocking waveform is such that it stays at a certain frequency for a time long enough to allow sufficient input pulses through for proper integration to take place. The clocking waveform from the function generator 56 can be a staircase waveform or a sawtooth waveform, for example.

The output of the function generator 56 is fed to a voltage controlled oscillator 58 which provides output pulses whose frequency $f_c$ is proportional to the amplitude of its input voltage. The output of the function generator 56 is also applied to the horizontal axis of an oscilloscope (not shown) to the vertical axis of which the output of the weighted integrator 18 is applied. The horizontal axis is calibrated to show the period of any pulses applied to the vertical axis.

Figure 2:
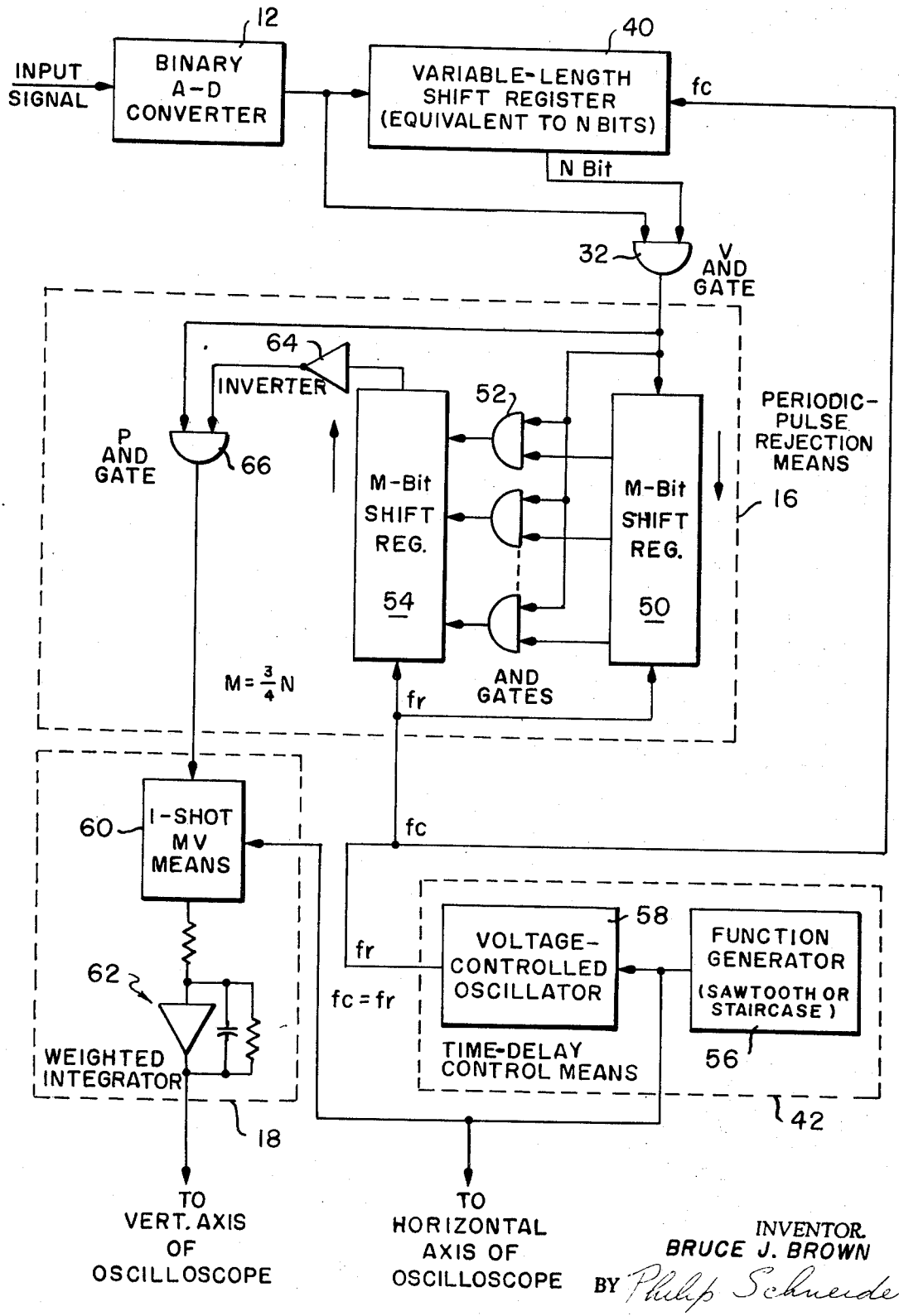
FIG. 2 is a schematic and block diagram of components which can be employed in the blocks of FIG. 1.

The constraints employed in the circuit of FIG. 3 also apply to the circuit of FIG. 2. Thus, $$N/2f_c < M/f_r < N/f_c$$

where $N$ is the number of bits in the variable-length shift register, $M$ is the number of bits in each M-bit shift register of the periodic-pulse rejection means, $f_c$ is the frequency of the clocking pulse to the variable-length shift register and $f_r$ is the frequency of the clocking pulses to the registers in the periodic-pulse rejection means.

In this embodiment of the invention, $f_c = f_r$ and therefore (½) $N < M < N$. A good choice of the value of $M$ is $M = (¾)N$. The periodic-pulse rejection means 16 comprises a first M-bit shift register 50 (hereafter also called the 1st P register, a set of intermediate AND gates 52 (hereafter also called the I-AND gates), a second M-bit shift register 54 (hereafter also called the 2nd P register), an inverter 54 and an output AND gate 66 (hereafter also called the P-AND gate). The parallel outputs of the first P register 50 are each coupled to a different one of the I-AND gates 52, the other input to each gate being the output of the V-AND gate 32. The outputs of the I-AND gates 52 are coupled independently and in order to the parallel inputs of the second P register 54. Thus, if $N = 20$, $M = 15$ and the 15th bit of the first P register 50 is coupled through its associated I-AND gate to the first bit of the second P register 54. (Note that the two P registers operate in opposite directions.). The output of the second P register is coupled to the P-AND gate 66 through an inverter 64. The other input to the P-AND gate 66 is the output signal from the V-AND gate 32.

The output of the P-AND gate 66 is coupled to a weighted integrator 18 comprising in this particular embodiment one-shot multivibrator (MV) means 60 and an integrator 62. The MV means includes a field effect transistor FET operated as a voltage-controlled variable resistance, the control voltage being the output of the function generator 56. The resistance of the FET is used as part of the RC circuit controlling the period of the multivibrator, such that the time of integration is proportional to the length of the period of the pulse train coming into the MV.

The invention is used to scan a certain predetermined range of frequencies, e.g., 500 to 2000 Hz, for periodic-pulse signals. When it is "looking at" a given frequency (e.g., 510 Hz), it will not allow other frequencies, not even harmonics of 510 Hz, to pass through. A regular spectrum analyzer shows the fundamental wave and its harmonics; the harmonics of the various fundamental waves frequently mask the signals which are present.

To explain the manner of operation of the device, several examples are in order:

EXAMPLE A

When the time delay provided by the register is the same as the period of the incoming signal. Thus, suppose $N = 20$, $f_c = 1000$ Hz ($T_c = 1$ millisecond), and the incoming signal has a frequency of 50 Hz; then the period of the incoming signal is 20 milliseconds and the time delay of the register is 20 milliseconds. The first pulse of the incoming signal reaches the Nth bit of the V register is 20 milliseconds and is applied to the V-AND gate. At the same time, the second pulse of the incoming signal occurs and is also applied to the V-AND gate. Thus the V-AND gate has signals at both of its inputs and therefore provides an output which is fed to the first P register. However, since it takes a pulse only 15 milliseconds (msec) to pass through this register and inputs to one input of each I-AND gate occur at 20 msec intervals, none of these gates will ever have anything but a zero output and the output of the second P register 54 will also be zero, giving a constant output from the inverter 64 on one input terminal of the P-AND gate 66. Thus, each time the V-AND gate 32 produces a pulse (at 20 msec intervals), there will be an output pulse from the V-AND gate 66. This output is at the frequency of the incoming signal and is integrated and fed to the utilization device, preferably an oscilloscope.

EXAMPLE B

When the input-signal period is somewhat above or below the time delay for which the V register is set. Let the input-signal period be 30 msec and the time delay through the V register be 20 msec. The first input pulse appears at the output bit of the V register 10 msec before the second input-signal pulse is applied to the V-AND gate. There is therefore no output from the V-AND gate and no input from the V-AND gate to the P-AND gate or from the integrator.

EXAMPLE C

When the input-signal period is a harmonic of the input signal which the V register is set to pass. Let the time delay through the V register be 20 msec and the input-signal period be 10 msec. All pulses which pass through the V register arrive at the V-AND gate at the same time as one of the input-signal pulses (thus the first input pulse will pass through the register in 20 msec and arrive at the AND-gate at the same time as the second input pulse). The output pulse from the V-AND gate is applied to the first P register and appears at the 10th bit 10 msec later when another output pulse is provided by the V-AND gate. These two pulses are applied to the 10th I-AND gate and produce an output pulse which is coupled to the 5th bit of the second P register. It takes this pulse 10 msec to appear at the output of this register. The pulse is fed to the inverter at this time and the inverter output becomes zero. Thus, 40 msec after the first input pulse is applied to the V register, a zero output is applied to the inverter input of the P-AND gate and at the same time, the second input pulse comes through the V-AND gate and is applied to the P-AND gate. Neither the second input pulse or any other input pulse thereafter can get through the P-AND gate to the integrator and the oscilloscope. Only the third and fourth input pulses are passed through the P-AND gate — all others are suppressed (the reader can see this by plotting the input signal and the outputs of the V-AND gate, the 10th bit of the first P register, the output of the second P register, the output of the inverter and the output of the P-AND gate below each other on a time axis). When the two pulses which pass through are integrated, the output is practically zero; thus harmonics are suppressed.

There are various methods by which the time delay can be varied. These may lead to different embodiments of the invention. Thus, 1. Change the length of the N-bit register and of the M bit registers, keeping the clock frequencies constant.
2. Change $f_c$ and the length of the M-bit registers while holding $f_r$ constant.
3. Change the length of the N-bit shift register and of $f_r$, while holding $f_c$ constant.
4. Change $f_c$ and $f_r$ while holding the lengths of all registers constant. This is the method used in the embodiment shown herein.

The device can also be used as a PRF filter which passes only one frequency and suppresses all others. This is done by keeping all variables constant for a given time interval.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the U.S. is:

1. A pulse-repetition-period (PRP) analyzer comprising, in combination:

means for converting an input waveform into a series of equal binary pulses, each occuring whenever said input waveform exceeds a predetermined level;

means connected to said binary converter means for sorting the pulses therefrom into a successive series of pulse trains ordered according to their pulse repetition periods;

means connected to said pulse-sorting means for rejecting the harmonics of any pulse train which is being passed through the PRP analyzer;

means connected to said harmonic-rejection means for individually integrating said fundamental pulse trains, the integrating periods being weighted in proportion to the relative lengths of the periods of said pulse trains; and time-delay control means connected to said sorting means, said periodic-pulse rejection means and said weighted integrator means for synchronizing the operations of said means and for changing, according to a predetermined schedule, the time by which a signal passing through said sorting means is delayed.

2. A PRP analyzer as in claim 1, wherein said sorting means comprises a variable-length shift register and an AND gate known as the V-AND gate, said AND gate receiving as inputs both the input to and the output from said variable-length shift register.

3. A PRP analyzer as in claim 2, further including means for visually displaying the output of said weighted-integrator means.

4. A PRP analyzer as set forth in claim 2, wherein said time-delay control means comprises a function generator connected to a voltage-controlled oscillator.

5. A PRP analyzer as set forth in claim 2, wherein said periodic-pulse rejection means comprises a first shift register having parallel outputs, a plurality of AND gates, each connected to receive the output of a different one of said bits of said first register, a second shift register having parallel inputs, each connected to receive the output from a different one of said AND gates, the two registers operating in opposite directions and each AND gate also receiving as an input the output of said V-AND gate, an inverter connected to receive as an input the output from the last bit of said second register, and an AND gate known as the P-AND gate receiving as inputs the inverter output and the output of said V-AND gate.

6. A pulse-repetition-period (PRP) analyzer comprising, in combination:

means for converting an input waveform into a series of equal binary pulses, each occurring whenever said input waveform exceeds a predetermined amplitude level;

means connected to said binary converter means for sorting the pulses therefrom into a successive series of pulse trains ordered according to their pulse repetition periods;

means connected to said pulse-sorting means for rejecting the harmonics of any pulse train at the input the period of which is the same as the time delay provided by said sorting means;

means connected to said harmonic-rejection means for individually integrating said fundamental pulse trains, the integrating periods being weighted in proportion to the relative lengths of the periods of said pulse trains; and time delay control means connected to said sorting means, said periodic-pulse rejection means and said weighted integrator means for synchronizing the operations of said means and for changing, according to a predetermined schedule, the time by which a signal passing through said sorting means is delayed.

7. A PRP analyzer as in claim 6, wherein said sorting means comprises a variable-length shift register and an AND gate known as the V-AND gate, said V-AND gate receiving as inputs both the input to and the output from said variable-length shift register.

8. A PRP analyzer as in claim 7, further including means for visually displaying the output of said weighted-integrator means.

9. A PRP analyzer as in claim 7, wherein said time-delay control means comprises a function generator connected to a voltage-controlled oscillator.

10. A PRP analyzer as set forth in claim 7, wherein said periodic-pulse rejection means comprises a first shift register having parallel outputs, a plurality of AND gates, each connected to receive the output of a different one of said bits of said first register, a second shift register having parallel inputs, each connected to receive the output from a different one of said AND gates, the two registers operating in opposite directions and each AND gate also receiving as an input the output of said V-AND gate, an inverter connected to receive as an input the output from the last bit of said second register, and an AND gate known as the P-AND gate receiving as inputs the inverter output and the output of said V-AND gate.

* * * * *